Figure 1:
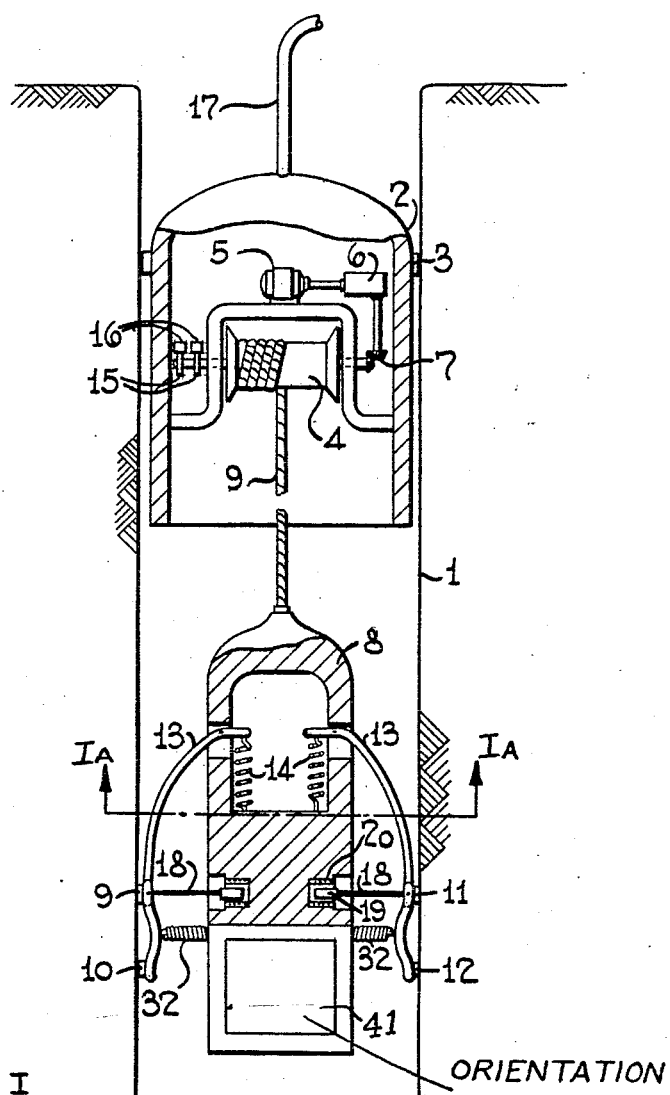

Oct. 13, 1953          E. V. MURPHREE           2,655,632
              ELECTRICAL RESISTIVITY DIP METER
Filed May 12, 1951                        3 Sheets-Sheet 1

Eger V. Murphree  Inventor
By W. O. T. Hilman  Attorney

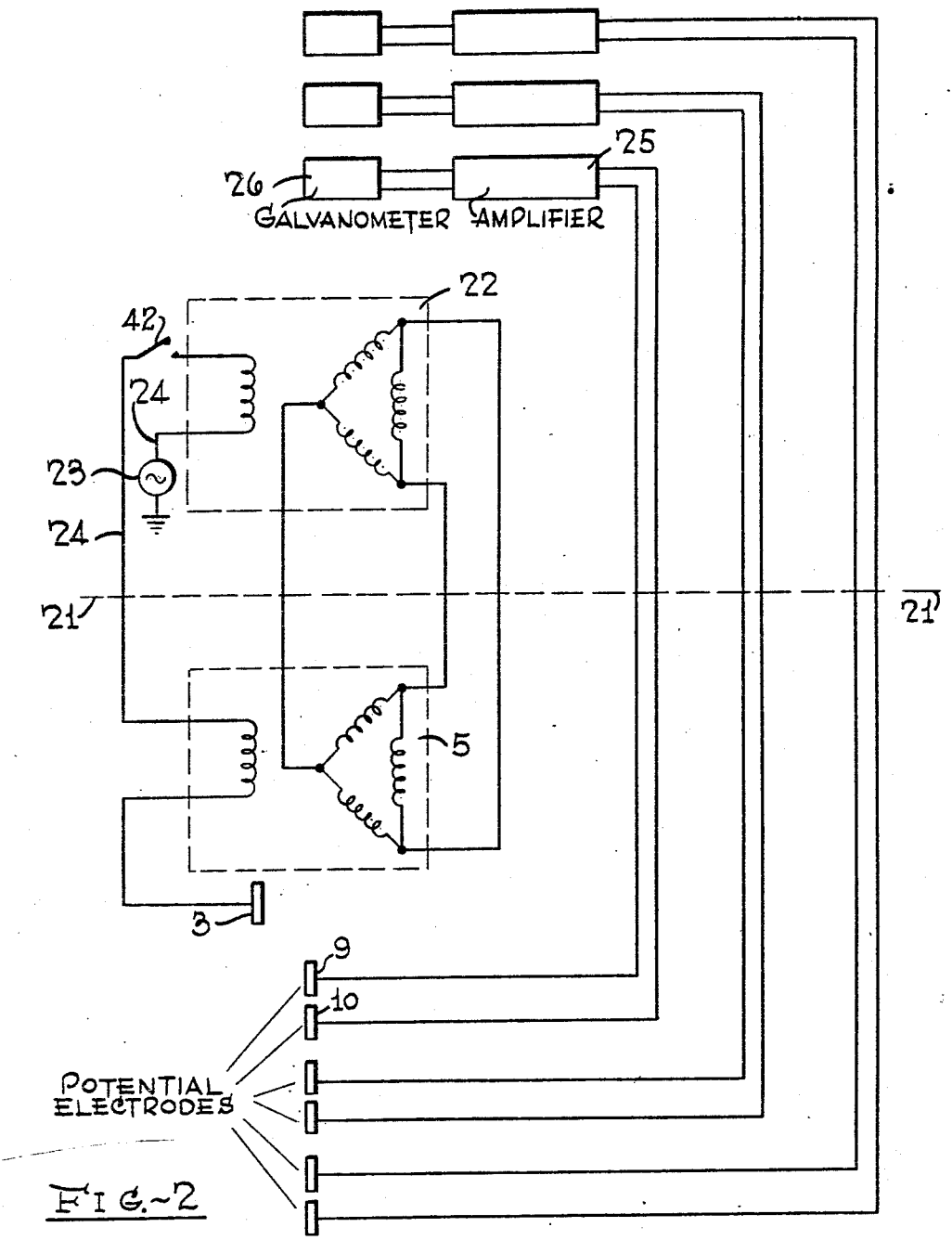

Patented Oct. 13, 1953

2,655,632

UNITED STATES PATENT OFFICE 2,655,632

ELECTRICAL RESISTIVITY DIP METER

Eger V. Murphree, Summit, N. J., assignor to Standard Oil Development Company, a corporation of Delaware Application May 12, 1951, Serial No. 226,039

10 Claims. (Cl. 324—10)

This invention concerns an improved apparatus for determining the dip and strike of strata traversed by a bore hole. In accordance with this invention, variations in electrical resistivity occurring at the boundary of different strata in the bore hole are employed to provide information as to the attitude of the strata. This is accomplished by determining the properties of electrical resistivity along at least three profiles of the bore hole while simultaneously determining the azimuthal orientation of the electrodes employed for this purpose. It is a particular feature of this apparatus that the necessary determinations of electrical resistivity are made by employing a "stationary field" technique. According to this technique, a "current electrode" is maintained stationary in the bore hole while "potential electrodes" are moved along the bore hole while the necessary determinations are made.

The practice of electrical logging has been well developed and widely employd in the examination of bore holes in the attempt to locate and produce petroleum. A great variety of electrode arrangements have been suggested for the general purpose of determining electrical properties of strata through which bore holes pass. The present invention is particularly adapted for use with the eelctrode system generally known as the "three electrode system." A three electrode system is described, for example, in the patent to Mounce, No. 2,376,168, granted May 15, 1945.

The three electrode system employs what is known as a "current electrode" positioned in the bore hole together with two "potential electrodes" which are also positioned in the bore hole. In reality a fourth electrode is also employed which is grounded at the surface of the ground—as by placing it in the slush pit associated with the mud circulation system employed in the well. This fourth electrode may also be called a "current electrode." A source of electrical potential is connected between the current electrode at the surface of the ground and the current electrode which is lowered into the bore hole, setting up a flow of current through the earth between the two current electrodes. The two potential electrodes, positioned in the bore hole, are employed to measure the potential difference existing adjacent the bore hole due to current flowing between the current electrodes. Conventionally, the down-the-hole current electrode, and the two potential electrodes are spaced apart on a common casing and moved along the bore hole in order to log the resistivity characteristics of the bore hole. The present invention is concerned with an adaptation of this conventional three electrode system permitting a determination of the dip and strike of strata.

A difficulty of the three electrode logging system of the nature heretofore indicated is that distortion appears in the determined resistivity characteristics of a bore hole, making it difficult to interpret the information. The primary factor causing distortion is that passage of the current electrode, as well as the potential electrodes past a high resistivity stratum causes variations in the potential difference recorded by the potential electrodes. Since it is desirable to determine resistivity changes occurring only due to movement of the potential electrodes past a boundary of differing resistivity, the alterations which occur on passage of the current electrode past such a boundary result in resistivity data which is difficult to interpret. As a result of the distortion caused by this factor, the type of log obtained in conventional three eelctrode logging systems disqualifies use of such systems for the purpose of making dip and strike determinations.

It has now been discovered that the logging record obtained in a three electrode system can be materially improved and simplified by employing what is known as the "stationary field technique." In this technique the down-the-hole current electrode is maintained stationary while the potential electrodes are moved either actually or effectively. Thus, for example, the potential electrodes may be suspended below the current electrode by a winch arrangement. Logging may then be conducted in a stepwise fashion by placing the current electrode at a given depth in the well and by raising the potential electrodes on the winch arrangement toward the current electrode. Thereafter, this procedure is repeated at different levels. This technique eliminates distortion of the resistivity log due to movement of the current electrode past boundaries of differing resistivities during the determinations. As a result, the stationary field technique provides electrical logs which are well suited for use in an apparatus for determining the dip and strike of strata.

To understand the basic principles on which this invention operates, consider the logging of a perpendicular bore hole. If three pairs of potential electrodes are spaced around the wall of a bore hole and are moved along the bore hole, in conjunction with properly positioned current electrodes, to obtain three resistivity profiles of the bore hole, it is apparent that information will be given indicating whether strata boundaries encountered are perpendicular to the bore hole or are inclined to the bore hole. Thus, if the three pairs of potential electrodes are moved past a boundary of differing resistivity lying in a horizontal plane, each of the electrodes will reach this boundary at the same instant and provide an alteration in resistivity readings at the same instant. If, however, such a boundary is inclined with respect to the bore hole, then the three pairs of electrodes will sequentially reach the boundary so that the resistivity changes recorded by each pair of electrodes will occur at a different instant. It is this principle which is employed in accordance with this invention.

In a preferred embodiment of the invention, one current electrode is grounded at the surface of the earth according to conventional practice. The other current electrode is positioned on a cable and is lowered into the bore hole, to be maintained at any desired depth therein. Three separate pairs of potential electrodes are urged against the bore hole by caliper arms supported by a casing which is independently suspended above or below the housing of the down-the-hole current electrode. For example, a winch arrangement may be provided in a housing supporting the current electrode to raise or lower the casing supporting the potential electrodes; the potential electrodes may thereby be moved with respect to the current electrode. Or again, one cable from the surface of the earth may be used to suspend the down-the-hole current electrode, while a second cable may be used to suspend the casing carrying the three pairs of potential electrodes. The potential electrodes are supported in a manner permitting the three pairs of electrodes to be forced against the wall of the bore hole at points which are preferably spaced 120 degrees apart with respect to the axis of the bore hole. Preferably each of the two potential electrodes making up a given pair of electrodes, are maintained in vertical alignment and are spaced apart a few inches to about one foot. This arrangement of electrodes essentially provides three pairs of electrodes spaced around the bore hole in two planes perpendicular to the axis of the bore hole so that the electrodes of each pair are in vertical alignment and displaced by about one foot. By moving these pairs of electrodes along the bore hole, each of the pairs of electrodes will provide an electrical resistivity profie of the portion of the bore hole along which it is moved. By a comparison of the determinations of the three pairs of electrodes, the sequence at which the pairs contact strata boundaries may be determined. This invention may be used to precisely indicate the dip and strike of strata intersecting the bore hole by correlating this information with other data which may be obtained.

Thus, it is necessary to know the azimuthal orientation of each of the electrodes at any point in the well at which dip information is desired. Due to torsional forces acting to rotate the electrodes in the bore hole as they are raised or lowered, it is necessary to employ apparatus which will at all times indicate in which direction the electrodes may have rotated. Azimuthal orientation devices are now known to the art which may be employed for this purpose.

Again for precise dip determinations it is necessary that the diametrical displacement of the calipers forcing the electrodes against the bore hole be known. Due to erosion and other factors, the diameter of the bore hole may vary substantially along its length. Consequently, it is necessary to essentially determine the diameter of the bore hole at any time at which a dip determination is required. This data may be provided by causing the calipers supporting the potential electrodes to develop electrical signals to continuously indicate the extension of the calipers, or, in other words, to indicate the diametrical displacement of the electrodes in the bore hole.

It is also necessary that precise depth measurements be available to indicate the depth at which the potential electrodes and the current electrode are suspended during dip determinations. The information required for this purpose may be obtained from conventional depth determinations of the housing carrying the current electrodes and the casing carrying the potential electrodes. This information may be obtained employing a conventional measuring wheel on the cable supporting the housing of the current electrode and by information as to the operation of the winch suspending the potential electrodes.

In the event, as is often the case, that the bore hole is not vertical, but somewhat inclined, it is also necessary that information be obtained as to the extent and direction of incline of the bore hole. This information may be obtained by reference to a conventionally conducted inclination log of the bore hole. Alternatively, an inclinometer may be made an intergral part of the apparatus of this invention.

Figure 3:
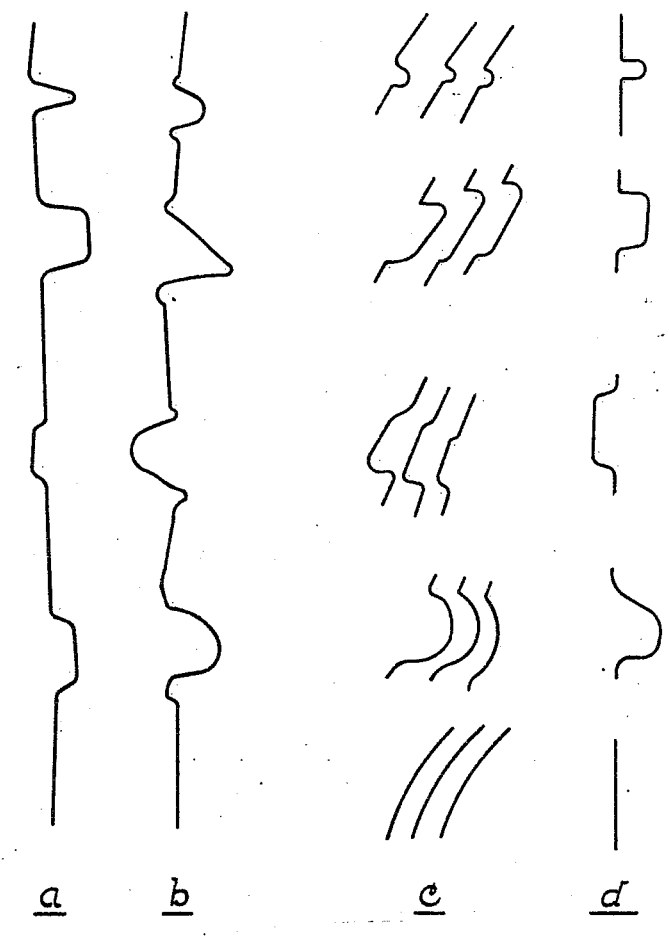

A preferred embodiment of this invention is diagrammatically illustrated in the accompanying drawings, in which:

Figure 1 shows an elevational section of the down-the-hole portion of the dip determining apparatus of this invention; and Figure 2 schematically indicates a wiring circuit for the principal components of the apparatus; and Figure 3 diagrammatically illustrates different types of electrical logs including the traces obtained in accordance with this invention.

Figure 1A:
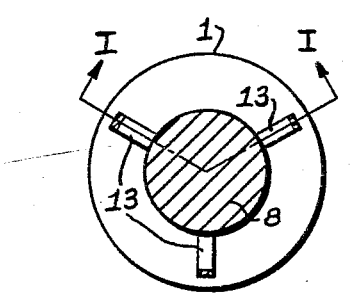

Referring now to Figure 1, the apparatus illustrated is lowered in a bore hole identified by numeral 1. The apparatus may consist of a suitable housing 2 provided with a current electrode 3, which may consist of a ring extending circumferentially around the casing 2 and insulated therefrom. Electrode 3 comprises the current electrode to be maintained at different levels within the bore hole as formerly indicated. The housing 2 includes a reel 4 driven by a Selsyn motor 5. The motor 5 is arranged to drive the reel 4 through a suitable speed reduction gear box 6 and bevel gearing 7. Operation of reel 4 controls the distance at which the apparatus 8 is suspended below housing 2 on cable 9. Casing 8 provides support for the three pairs of potential electrodes required. For simplicity, the drawing of Figure 1 shows only two pairs of potential electrodes. As shown by Figure 1a, three pairs of potential electrodes are actually employed which are equally spaced about the circumference of the apparatus. Thus the potential electrodes comprise a first pair 9 and 10, and a second pair 11 and 12. Each of the electrodes are fixed on a caliper arm 13 which is pivotally supported by casing 8 and is urged against the bore hole by spring 14. The electrodes are preferably disc-shaped and are imbedded in an insulating material as by molding or vulcanizing them in place so that no liquid may contact an electrode at any place other than at its exposed face. Caliper arm 13 is articulated adjacent electrode 9 or 11, so that the lower portion of the caliper may be urged against the bore hole by spring 32. This insures contact of both electrodes 10 and 12 with the wall of the bore hole. For simplicity the electrical connections to the electrodes have not been shown in Figure 1, it being understood that suitable insulated conductors extend from each of the electrodes into the casing 8 and through cable 9 to housing 2. Cable 9 is arranged on reel 4 so that slip rings 15 on the shaft of reel 4 may transmit the readings of the electrodes through suitable brushes 16 connected to insulated conductors in the cable 17 leading to the surface of the ground. Since each of the caliper arms 13 are urged forcibly against the bore hole, each of the potential electrodes 9 to 12 will be forced through the mud of the bore hole in proximity or in direct contact with the strata forming the wall of the bore hole. This minimizes interference in resistivity readings caused by the presence of drilling mud in the bore hole. The caliper arms are of suitable dimensions so that electrodes 9 and 10 making up one pair of electrodes are vertically displaced by about 2 to 12 inches, while electrodes 11 and 12 comprising the second pair of electrodes are similarly displaced.

Information as to extension of each of the caliper arms may be provided by the means diagrammatically illustrated. A slender drive rod 18 may be pivotally fixed to each of the caliper arms 13. The other end of the drive rods 18 may terminate in an armature core 19 disposed within a solenoid coil 20. As a consequence of this arrangement as a caliper arm 13 is moved inwardly or outwardly by contact with the bore hole, the armature 18 will be moved into or out of the field of the solenoid coil. Consequently, by determining the inductance of each of the solenoid coils, the extension of each of the calipers may be ascertained. Again, for simplicity, the electrical conductors extending from each solenoid upwardly to reel 4 establishing an electrical circuit through the brushes 15 and thence to the conductors of cable 17 have not been illustrated. It is apparent that many alternative methods may be employed for determining the extension of the calipers and use of the solenoid coils as indicated is only intended for exemplary purposes.

The arrangement of caliper arms described, forcing the electrodes against the bore hole has the important function of maintaining the entire casing 8 in general alignment with the bore hole and essentially at the center of the bore hole. This follows from the fact that if one of the caliper arms were to be greatly compressed, the resulting tension on its associated spring 14 would cause shifting of the entire casing 8 toward the opposite side of the bore hole to equalize tension on each of the springs 14. This effect insures the apparatus maintaining a central position in the bore hole. Similarly, it follows that the springs 32 associated with the articulated portion of each caliper arm co-act with springs 14 to the apparatus in substantaial alignment with the bore hole.

Casing 8 provides a protective housing for other apparatus which may be employed. Thus, it is necessary that an orientation indicator 41 be provided in casing 8. Any of the orientation devices known to the art may be employed. For example, the apparatus disclosed and claimed in U. S. Patent No. 2,332,777, issued to Boucher in October 26, 1943 may be employed. As this element is no part of the present invention, it will not be described in detail. It will be understood however, that the orientation instrument 41 is of a nature to provide information as to azimuthal position of the casing 8, and consequently of each of the calipers and each of the electrodes associated with the casing.

In addition to the apparatus specifically illustrated in Figure 1, it is to be understood that a suitable measuring wheel is to be associated with the apparatus at the surface of the earth to determine the depth of the casing 2 in the bore hole. As described therefore, the apparatus of Figure 1 provides information as to the potential difference between the pairs of electrodes carried by the casing 8 and suspended from housing 2. In addition, electrical information will be provided at the surface of the earth in regard to the extension of the caliper arms and as to the azimuthal orientation of the casing 8.

The circuit diagram for the principal electrical components of the apparatus of Figure 1 is illustrated in Figure 2. In Figure 2 all portions of the circuit below the line 21—21 indicates the down-the-hole portion of the apparatus, while the portion of the circuit above line 21—21 is associated with apparatus at the surface of the earth. Referring to Figure 2, a Selsyn motor 22 at the surface of the earth is driven in synchronism with the Selsyn motor 5 positioned in casing 6 in the bore hole. Switch 42 controls the starting and stopping of the motors as described. It will be understood that as an alternative to this arrangement the reel may be operated by a conventional motor so that the Selsyn 5 attached to the reel will cause recorder Selsyn 22 to turn proportionately to the reel. A source of alternating current 23 has one terminal grounded while the other terminal is connected to an electrical conductor 24 supplying current to the field coils of both of the Selsyn motors and also supplying current to the current electrode 3 located on the housing 2 in the bore hole. The Selsyn motor circuit thus constitutes a control circuit for correlating the changes in distance between the current electrode 3 and the potential electrode supported on casing 8. Thus operation of Selsyn motor 22 associated with a recording paper or film serves to simultaneously operate Selsyn motor 5 in a manner to raise casing 8 or reel 4 towards housing 2.

Each of the potential electrodes on casing 8 such as electrodes 9 and 10 is electrically connected to a vacuum tube measuring apparatus 25 associated with a galvanometer 26. The galvanometer 26 may be of the nature controlling the position of a mirror so as to effect the position at which reflected light will impinge on photographic film moved by Selsyn motor 22. As a result, a record will be obtained as to the potential readings of each of the three pairs of electrodes carried by casing 8. In addition, it is understood that means are associated with the record to simultaneously indicate the orientation of casing 8 and the depth at which the potential electrodes are positioned in the bore hole.

Referring now to Figure 3 traces of the nature obtained in three electrode systems are illustrated. The curve shown as Figure 3-b indicates the type of log obtained in the conventional three electrode system, showing the trace provided by a single pair of potential electrodes. For comparative purposes Figure 3-a shows the appearance of what would be an ideal electrical log. In comparing curves 3–a and 3–b, it will be noted that the conventional electrode system is not effective in clearly indicating the location of boundaries between strata. Finally, Figure 3–c illustrates the type of logging record obtained with the apparatus described. In Figure 3–c records of each of the three pairs of electrodes employed are indicated.

It will be noted that the curves obtainable reasonably approximate the ideal logging record of Figure 3–a. Each of the separate groups of curves indicated in Figure 3–c correspond to a stepwise movement of the logging apparatus in the bore hole. As illustrated, each of these curves slopes upwardly and to the right since as the distance between the potential electrodes and the current electrode is altered, the potential difference varies as a square of this change in distance. It is for this reason that the distance to which the potential electrodes are suspended below the current electrode becomes important. Because of this factor the potential electrodes must not be more than about 30 feet below the current electrode as the maximum. The uppermost of the three comparative curves of Figure 3–c indicate that each of the pairs of electrodes encountered a boundary at the same instant, showing this boundary was perpendicular to the axis of the bore hole. The next lower of the group of curves in Figure 3–c shows a difference in the contact time of a second boundary between the different pairs of electrodes indicating this boundary was inclined with respect to the bore hole. By correlating the data of Figure 3–c with orientation information showing the azimuthal position of each of the electrodes, it is thus possible to accurately determine the dip and strike of the boundaries indicated.

A convenient and valuable modification of the apparatus described depends upon a correction for the varying distance between the stationary current electrode and the moving potential electrodes. By suitably correcting for this factor, a curve such as 3–d may be obtained. This may readily be accomplished by positioning a logarithmically wound potentiometer on the shaft of Selsyn motor 22. The voltage taps of this potentiometer are to be connected to conductor 24 leading to the down-the-hole current electrode 3. Consequently, on rotation of Selsyn motor 22, affecting the distance of the potential electrodes below the current electrodes, the amount of current reaching the current electrode will automatically be corrected to compensate for the varying distance between the current electrode and the potential electrodes.

As formerly indicated, to secure precise dip and strike data accounting for varying inclinations of the bore hole, it is valuable to include an inclinometer in the casing 8 supporting the potential electrodes. The inclinometer must be of the nature capable of indicating both the extent and direction of inclination of casing 8. An inclinometer of the type disclosed in U. S. Patent No. 2,365,999, issued to Boucher, December 26, 1944, may be adapted for use in this invention. It is necessary to synchronize the operation of the inclinometer with the general type of orientation indicator formerly described.

In the embodiment of the apparatus illustrated and particularly described, the potential electrodes are actually moved with respect to the stationary current electrode during determinations. The necessity for actual movement of the potential electrodes may be eliminated by various modifications. For example, by employing a number of potential electrodes vertically aligned in the bore hole and by switching two different pairs of these electrodes operating at different levels in the bore hole it is possible to secure the constructive movement of the potential electrodes relative to the current electrode without necessity for the actual movement of these electrodes.

What is claimed is:

1. A dip and strike determining apparatus for logging of bore hole, comprising in combination a housing carrying a current electrode supported in said bore hole, a casing positioned below said housing means within said housing adapted to vary the position of the said casing below said housing, said casing being provided with at least three caliper arms substantially spaced from each other about the circumference of the casing, said caliper arms including means to urge them outwardly of the casing, a pair of electrodes positioned on each of said calipers, and independent electrical circuit connections between each of said three pairs of electrodes and recording apparatus at the surface of the earth.

2. The apparatus defined by claim 1 in which the said means to control the position of the casing below the housing comprises a Selsyn motor and in which the said recording apparatus includes a synchronized Selsyn motor whereby movement of the recording apparatus indicates the depth below the said housing at which the said pairs of electrodes are located.

3. The apparatus defined by claim 1 including means to determine the azimuthal orientation of the said casing.

4. The apparatus defined by claim 1 in which the electrodes comprising a pair of electrodes are spaced apart on each caliper arm by a distance of about 2 to 12 inches.

5. Apparatus for determining the dip and strike of strata traversing a bore hole comprising means for maintaining a first electrode in a fixed position within said bore hole, means for positioning at least three pairs of electrodes at a distance less than about 30 feet from said first electrode, said pairs of electrodes being spaced substantially apart from each other around the circumferences of the bore hole, and means for varying the effective distance between said three pairs of electrodes and said first electrode.

6. The apparatus defined by claim 5 in which each pair of the said three pairs of electrodes comprises two electrodes maintained in substantially vertical alignment and spaced from each other.

7. The apparatus defined by claim 5 including means to force each of the electrodes making up the said three pairs of electrodes against the bore hole wall.

8. The apparatus defined by claim 5 in which the said means for positioning the three pairs of electrodes includes means to determine the azimuthal orientation of said pairs of electrodes.

9. The method of determining the dip and strike of strata traversing a bore hole in which a first electrode is sequentially maintained at different fixed positions in the bore hole and in which three pairs of electrodes spaced substantially apart from each other around the circumference of the bore hole are effectively moved with respect to the said first electrode while said first electrode is maintained in a fixed position and simultaneously exhibiting the depth of the said pairs of electrodes in the borehole, the azimuthal orientation of said electrodes, and potential differences detected by said pairs of electrodes, whereby the dip and strike of strata may be determined.

10. In logging apparatus, the electrode arrangement which comprises a first electrode means to support said electrodes at a desired fixed position in a bore hole, vertically aligned paired electrodes spaced substantially apart from each other around the circumference of the bore hole and means to support said paired electrodes in the borehole at a variably spaced distance spaced from said electrode.

EGER V. MURPHREE.

References Cited in the file of this patent

UNITED STATES PATENTS

| Number | Name | Date |
| --- | --- | --- |
| 2,102,080 | Kinley | Dec. 14, 1937 |
| 2,262,419 | Athy et al. | Nov. 11, 1941 |
| 2,307,887 | Haynes | Jan. 12, 1943 |
| 2,340,987 | Robidoux | Feb. 8, 1944 |
| 2,393,009 | Chun | Jan. 15, 1946 |
| 2,400,678 | Archie | May 21, 1946 |
| 2,414,194 | Ennis | Jan. 14, 1947 |
| 2,415,636 | Johnson | Feb. 11, 1947 |
| 2,427,950 | Doll | Sept. 23, 1947 |
| 2,476,137 | Doll | July 12, 1949 |
| 2,502,775 | Brandon | Apr. 4, 1950 |
| 2,552,428 | Hildebrandt | May 8, 1951 |